(12) United States Patent
Bas et al.

(10) Patent No.: US 11,115,138 B2
(45) Date of Patent: Sep. 7, 2021

(54) METHOD FOR ANTENNA OCCLUSION DETECTION

(71) Applicant: Apple Inc., Cupertino, CA (US)

(72) Inventors: Celalettin U. Bas, San Francisco, CA (US); Joachim S. Hammerschmidt, Mountain View, CA (US); Ming Lei, San Jose, CA (US); Pengcheng Zhan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/788,209

(22) Filed: Feb. 11, 2020

(65) Prior Publication Data

US 2021/0058169 A1 Feb. 25, 2021

Related U.S. Application Data

(60) Provisional application No. 62/888,900, filed on Aug. 19, 2019.

(51) Int. Cl.
| | |
|---|---|
| *H04B 7/04* | (2017.01) |
| *H04B 17/11* | (2015.01) |
| *H01Q 3/24* | (2006.01) |
| *H01Q 21/28* | (2006.01) |
| *H04B 17/21* | (2015.01) |
| *H04B 17/318* | (2015.01) |

(Continued)

(52) U.S. Cl.
CPC .............. *H04B 17/21* (2015.01); *H01Q 1/243* (2013.01); *H01Q 3/247* (2013.01); *H01Q 21/28* (2013.01); *H04B 7/0808* (2013.01); *H04B 7/0814* (2013.01); *H04B 7/0888* (2013.01); *H04B 17/318* (2015.01); *H04W 68/005* (2013.01)

(58) Field of Classification Search
CPC .......... H04B 7/06; H04B 7/0602; H04B 7/08; H04B 7/0802; H04B 7/0808; H04B 17/00; H04B 17/10; H04B 17/11; H04B 17/20; H04B 17/21; H04B 7/04; H04B 7/0814; H01Q 1/243; H01Q 3/247; H01Q 21/28; H01Q 25/00
See application file for complete search history.

(56) References Cited

U.S. PATENT DOCUMENTS

| | | | |
|---|---|---|---|
| 2019/0150003 A1* | 5/2019 | He | H04B 7/086 342/368 |
| 2019/0207666 A1* | 7/2019 | Son | H04B 7/0802 |

(Continued)

*Primary Examiner* — Blane J Jackson
(74) *Attorney, Agent, or Firm* — Kilpatrick Townsend and Stockton LLP

(57) ABSTRACT

Techniques are disclosed for detecting obstruction of a device's antenna(s) and then changing an operation of the device. A transmission time at which an antenna of an electronic device transmitted a signal can be identified. A response signal can be detected that was received at a receiver of the electronic device subsequent to the transmission time. Based on the response signal and on the transmission time, one or more response-signal characteristics can be determined. Based on the one or more response-signal characteristics, it can be determined that the antenna or that another antenna of the electronic device is at least partly blocked from emitting or receiving signals. In response to determining that the antenna is at least partly blocked, a changed type of operation can be identified, and the changed type of operation can be performed.

20 Claims, 8 Drawing Sheets

(51) Int. Cl.
    *H04B 7/08* (2006.01)
    *H04W 68/00* (2009.01)
    *H01Q 1/24* (2006.01)

(56) References Cited

U.S. PATENT DOCUMENTS

| | | | |
|---|---|---|---|
| 2019/0341986 A1* | 11/2019 | Raghavan | H04B 17/327 |
| 2020/0177223 A1* | 6/2020 | Fernando | H04B 1/3838 |
| 2020/0236606 A1* | 7/2020 | Yang | H04W 36/305 |
| 2020/0328797 A1* | 10/2020 | Gajula | H04W 52/367 |
| 2020/0412417 A1* | 12/2020 | Calzolari | G06N 3/084 |
| 2021/0067209 A1* | 3/2021 | Gopal | H04L 5/0032 |

* cited by examiner

METHOD FOR ANTENNA OCCLUSION DETECTION

CROSS-REFERENCES TO RELATED APPLICATIONS

This application claims the benefit of U.S. Provisional Application No. 62/888,900, filed Aug. 19, 2019, entitled "METHOD FOR ANTENNA OCCLUSION DETECTION." The disclosure of this application is incorporated by reference herein in its entirety.

BACKGROUND

Wireless communications between electronic devices has become increasingly common. In some instances, a source device indiscriminately emits a signal, which may then be detected by any nearby device. Alternatively, a source device may control a directionality of a signal transmission, such that it is more likely to be detected (with relatively high signal quality) by a device positioned along a particular direction as compared to a comparable device positioned along another direction. For example, this directionality control may be performed using beamforming. Conversely, a receiving device may differentially control receivers and/or process received signals to preferentially detect signals from a given direction.

However, the usefulness of controlling a reception or transmission directionality depends on being able to identify a particular direction of interest. A challenge in identifying a direction of interest is that a local environment of an electronic device frequently changes. For example, with respect to a mobile phone, the mobile phone may be placed screen-side up on a surface, placed screen-side down on a surface, place in a user's pocket, held in a user's hand, etc. Thus, reliability identifying a transmission or reception direction of interest may be challenging.

SUMMARY

In some embodiments, an electronic device is provided that can include a transmitter, a receiver, an antenna coupled to the transmitter and to the receiver, one or more data processors, and a non-transitory computer readable storage medium containing instructions which, when executed on the one or more data processors, cause the one or more data processors to perform actions. The actions can include identifying a transmission time at which the transmitter transmitted a signal and detecting a response signal received at the receiver subsequent to the transmission time. The actions can also include determining, based at least in part on the response signal and on the transmission time, one or more response-signal characteristics and determining, based at least in part on the one or more response-signal characteristics, that the antenna is at least partly blocked from emitting or receiving signals. The actions can further include in response to determining that the antenna is at least partly blocked and performing a changed type of operation.

In some embodiments, a computer-implemented method is provided. A transmission time at which an antenna of an electronic device transmitted a signal can be identified. A response signal can be detected that was received at a receiver of the electronic device subsequent to the transmission time. Based at least in part on the response signal and on the transmission time, one or more response-signal characteristics can be determined. Based at least in part on the one or more response-signal characteristics, it can be determined that the antenna or that another antenna of the electronic device is at least partly blocked from emitting or receiving signals. In response to determining that the antenna is at least partly blocked, a changed type of operation can be performed.

In some embodiments, a computer-program product tangibly embodied in a non-transitory machine-readable storage medium is provided. The computer-program product can include instructions configured to cause one or more data processors to perform actions. The actions can include detecting an impulse-response signal received at a receiver of the electronic device. The impulse-response signal can correspond to an impulse signal transmitted by an antenna of the electronic device. The actions can also include determining, based at least in part on the impulse-response signal, one or more impulse-response-signal characteristics. The actions can further include determining, based at least in part on the one or more impulse-response-signal characteristics, that the antenna or that another antenna of the electronic device is at least partly blocked from emitting or receiving signals. The actions can still further include in response to determining that the antenna is at least partly blocked, performing a changed type of operation.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

Figure 1A:
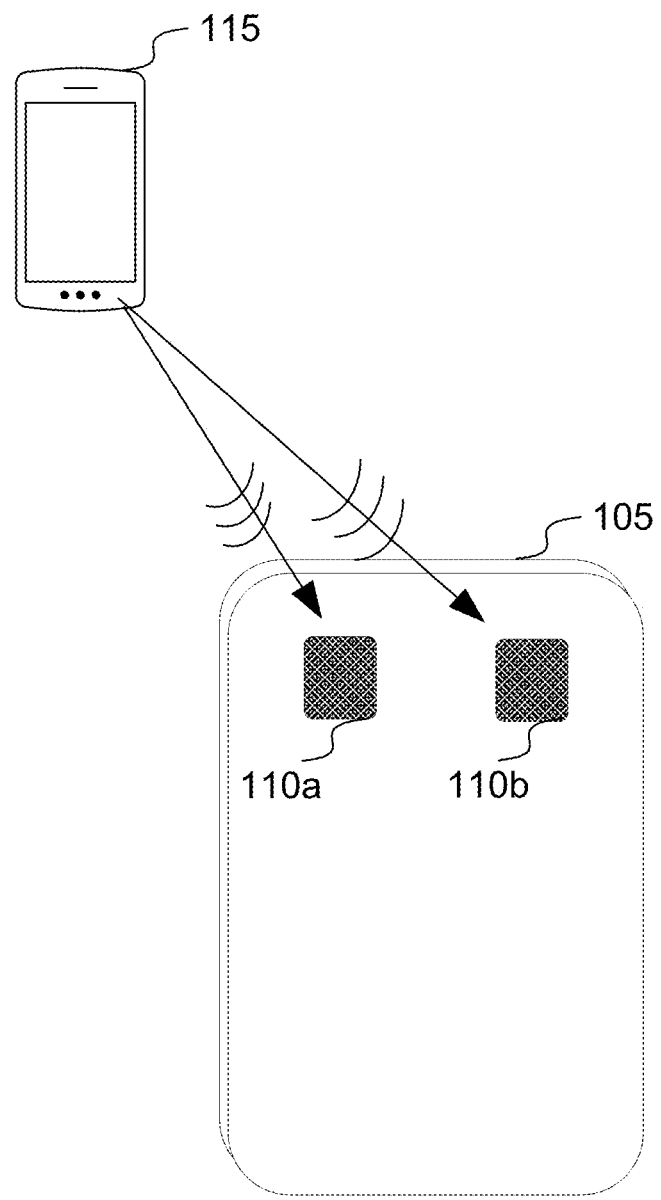
FIGS. 1A-1B illustrate signal transmissions from one device to another device.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems and methods can use one or more antennas on a device to transmit one or more impulse signals and detect one or more impulse response signals (i.e., one or more channel impulse responses). (It will be appreciated that another type of signal may be used instead of an impulse signal, such as a continuous wave, chirp, pulse, multi-tone or OFDM. A corresponding response signal can then be detected.) The impulse response signal(s) can be assessed to determine whether any device antenna is partly or fully blocked. For example, data (including one or more magnitudes or statistics) of each of the impulse response signal(s) can be compared to corresponding data (including one or more corresponding magnitudes or statistics) of a baseline response signal. The comparison can include assigning the data to a cluster of a set of clusters. Each of the set of clusters may be associated with estimates as to whether (and/or which of) any antenna is blocked. In some instances, the comparison alternatively or additionally includes comparing an in-phase and/or quadrature component of an impulse response signal to an imaginary an in-phase and/or quadrature component of a baseline impulse response signal. A baseline impulse-response signal can be defined for each antenna of the device (and/or for each transmitter-receiver pair of the device) and can correspond to an environment in which each antenna on the device is not blocked, such that transmission and/or reception of signals is not impaired. The baseline impulse-response signal(s) may have been at least partly defined based on a calibration. A comparison statistic may be generated by comparing a given impulse response signal to a baseline impulse response. For example, the comparison statistic can include an absolute difference or fractional difference between a maximum magnitude of the impulse response signal (or component thereof) and a maximum magnitude of the baseline signal (or component thereof) or between a magnitude of the impulse response signal (or component thereof) at a particular time point and an intensity of the baseline signal (or component thereof) at the particular time point. As another example, the comparison statistic can be defined as an integral of the difference of the two signals.

If it is determined that an antenna is at least partly or fully blocked, it can be determined whether to change an operation of the device from a default operation to a modified operation. In some instances, the determination is based on to which cluster(s) impulse-response data was assigned. A default and changed operation may relate to whether and/or how to perform a direction-of-arrival analysis and/or whether and/or how to perform a signal-processing technique. For example, a default operation may include performing a direction-of-arrival analysis that estimates a direction of another device. The direction can include at least two dimensions. For example, the direction can include a Cartesian-coordinate direction (e.g., an (x, y, z) direction or (x, y) direction) or a spherical-coordinate direction (e.g., a (θ, φ) direction). A changed operation may include performing refraining from performing a direction-of-arrival analysis or performing a modified direction-of-arrival analysis. A modified direction-of-arrival analysis may estimate a direction of another device but using a reduced dimensionality and/or with reduced precision. For example, the direction identified using a changed operation can include estimating a direction only along one (or two) Cartesian-coordinate axes (e.g., so as to identify a direction along a horizontal axis or a direction along a vertical axis) or to estimate a single spherical-coordinate angle (e.g., a polar angle or an azimuth angle).

In some instances, a changed operation can correspond to signal processing. For example, in a default state, beamforming may be performed to preferentially transmit and/or receive signals that correspond to a direction of interest. A direction of interest in a default state may be defined in more dimensions and/or with higher precision that a direction of interest in a changed state. For example, the direction of interest may be restricted to only a horizontal or only a vertical direction in a changed state, while including both a horizontal and vertical direction in a default state. In some instances, a changed operation includes temporarily refraining from performing signal processing of a given type (e.g., beamforming).

Figure 1B:
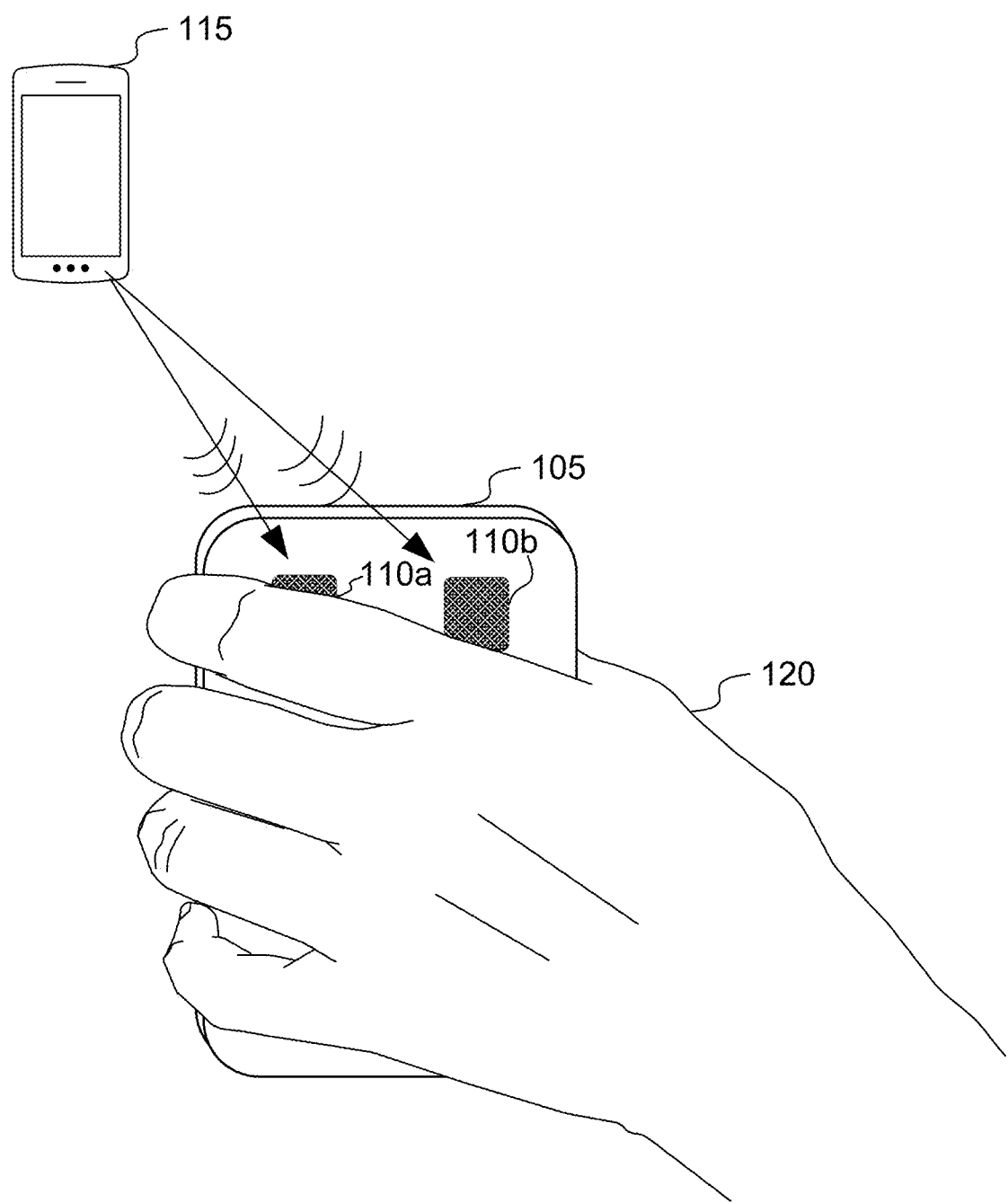

FIGS. 1A-1B illustrate signal transmissions from one device to another device. An electronic device 105 includes a first antenna 110a and a second antenna 110b positioned on an outer surface of electronic device 105. Electronic device 105 can include (for example) a mobile phone, a tablet, a laptop, and/or a wearable device. In the instance depicted in FIG. 1A, another electronic device 115 emits a signal (e.g., electromagnetic waves). The signal is received by each of first antenna 110a and second antenna 110b. Device 105 can detect a time at which the signal was received at each of the antennas, and then use the relative positions of the antennas and the times of signal receptions to estimate where other device 115 is relative to electronic device 105. In this depicted instance, first antenna 110a can receive the signal before second antenna 110b, which can provide information about where other device 115 is on a horizontal axis relative to electronic device 105.

FIG. 1B illustrates an instance in which the signals from other device 115 are obstructed. Here, a user's hand 120 is positioned over electronic device 105. As a result, a signal from other device 115 may be blocked in its entirety from reaching an antenna or otherwise obstructed. For example, user's hand 120 may cause local scattering of the signal, which may impair efforts to identify relative timings at which signals were received at the antennas.

Figure 2A:
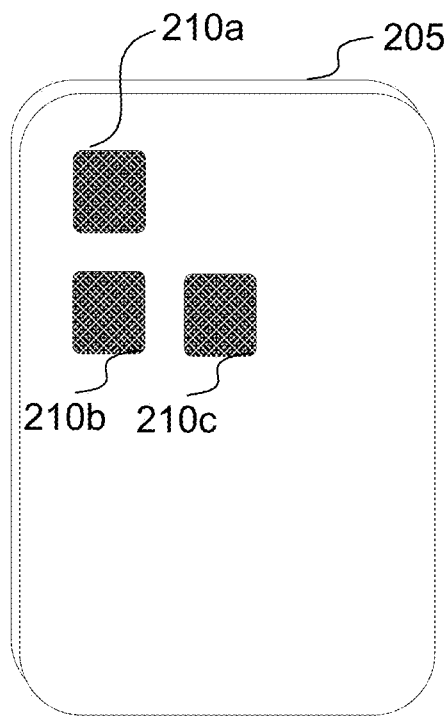
FIG. 2A depicts a device with an exemplary antenna configuration according to some embodiments of the present invention.

FIG. 2A depicts an electronic device 205 with an exemplary antenna configuration according to some embodiments of the present invention. Electronic device 205 can include a set of antennas positioned at and/or on a surface (e.g., a back surface and/or surface opposite to a surface including a main screen) of electronic device 205. A first antenna 210a can be positioned in-line with a second antenna 210b along a first axis. A third antenna 210c can be positioned in-line with second antenna 210b along a second axis that is substantially or that is perpendicular to the first axis. In some instances, each of first antenna 210a, second antenna 210b and third antenna 210c can be configured to be used for direction-of-arrival analyses. Electronic device 205 may further include another antenna that may be used (for example) for communications corresponding to calls or messages and/or for ranging purposes.

It will be appreciated that, while FIG. 2A depicts three antennas, techniques disclosed herein may be used via a single antenna, two antennas or more than three antennas. Using a single antenna may require a higher receiver dynamic range to achieve a same accuracy of antenna-obstruction estimates and/or direction-of-arrival estimates. However, using a single antenna may have advantages of consuming less device surface space. Further, using a single device can require less time to collect impulse response signals and process the impulse response signals, which may facilitate repeating the estimations more frequently. Using multiple antennas to transmit and receive data may be performed (for example) using time division, code division, etc. Accuracy of antenna-obstruction analyses results may be improved when multiple antennas are used due to (for example) redundancy of the data and potentially an ability to use cross-antenna signals that may be less confounded by transmitter-receiver leakage. However, use of multiple antennas may consume more surface space and use more power.

First antenna 210a, second antenna 210b and third antenna 210c may (but need not) be a same type of antenna and/or a same or similar size. For example, each of one, more or all of antennas 210a-c can be singularly polarized and/or horizontally polarized antenna. Alternatively or additionally, each of one, more or all of antennas 210a-c can be a multi-polarized antenna, vertically polarized antenna, circularly polarized antenna, EH antenna or fractal antenna. Each of one more or all of first antenna 210a, second antenna 210b and third antenna 210c can be a planar and/or flat antenna.

A width and/or height of each of one or more first antenna 210a, second antenna 210b and third antenna 210c can be defined to be (for example) approximately or exactly equal to half of a default wavelength defined for a signal to be transmitted by a transmitted connected to the antenna. In some instances, a width and/or height of each of one or more first antenna 210a, second antenna 210b and third antenna 210c can be defined to be at least, approximately or less than 5 mm, 1 cm, 1.5 cm or 2 cm.

A separation distance between each of two in-line antennas can be defined to be (for example) approximately or exactly equal to half of a default wavelength defined for a signal to be transmitted by a transmitted connected to the antenna. In some instances, separation distance between each of two in-line antennas can be defined to be at least, approximately or less than 5 mm, 1 cm, 1.5 cm or 2 cm.

Figure 2B:
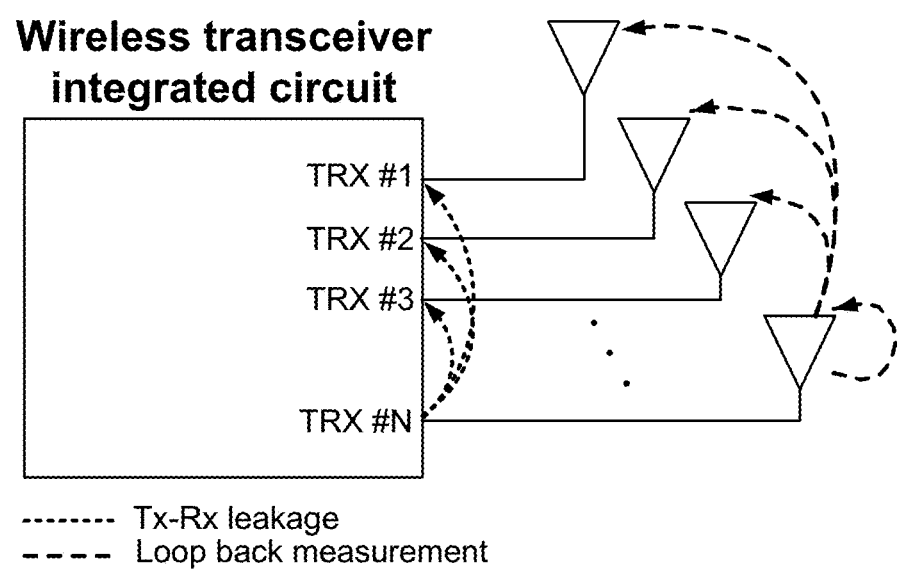
FIG. 2B illustrates signal transmissions between antennas.

FIG. 2B illustrates signal transmissions between antennas. Specifically, an integrated circuit can be configured to control transmissions at each of a set of transmitters and to detect signals at each of a set of receivers. In the depicted instance, a single transmitter (TRX #N) has transmitted a signal. The transmission can cause the integrated circuit to detect multiple signals. For example, the integrated circuit can cause each receiver to begin collecting signals at a same time that a transmitter transmits an impulse signal. Some signal detections are a result of leakage across the circuit board, while others correspond to loop-back measurements, in that a signal is transmitted, propagates across an external space and is received at a receiver. Thus, the leakage signals should be unaffected by antenna occlusion, while a loop-back signal may be affected by occlusion of a transmitting antenna and/or receiving antenna.

The integrated circuit can use received signals to not only determine whether any antenna is blocked but also to determine which antenna(s) is/are blocked. For example, suppose that an impulse response signal received at the top first received differs from a baseline impulse response signal. If assessed in isolation, the difference may be a result of a blockage of an antenna of the bottom transmitting antenna or a result of a blockage of the receiving antenna. However, if impulse response signals received at the second, third and fourth antennas all correspond to respective baseline impulse response signals (associated with a transmission from the fourth transmitter), then it can be inferred that the receiving antenna is blocked and that the transmitting antenna is not.

Figure 3:
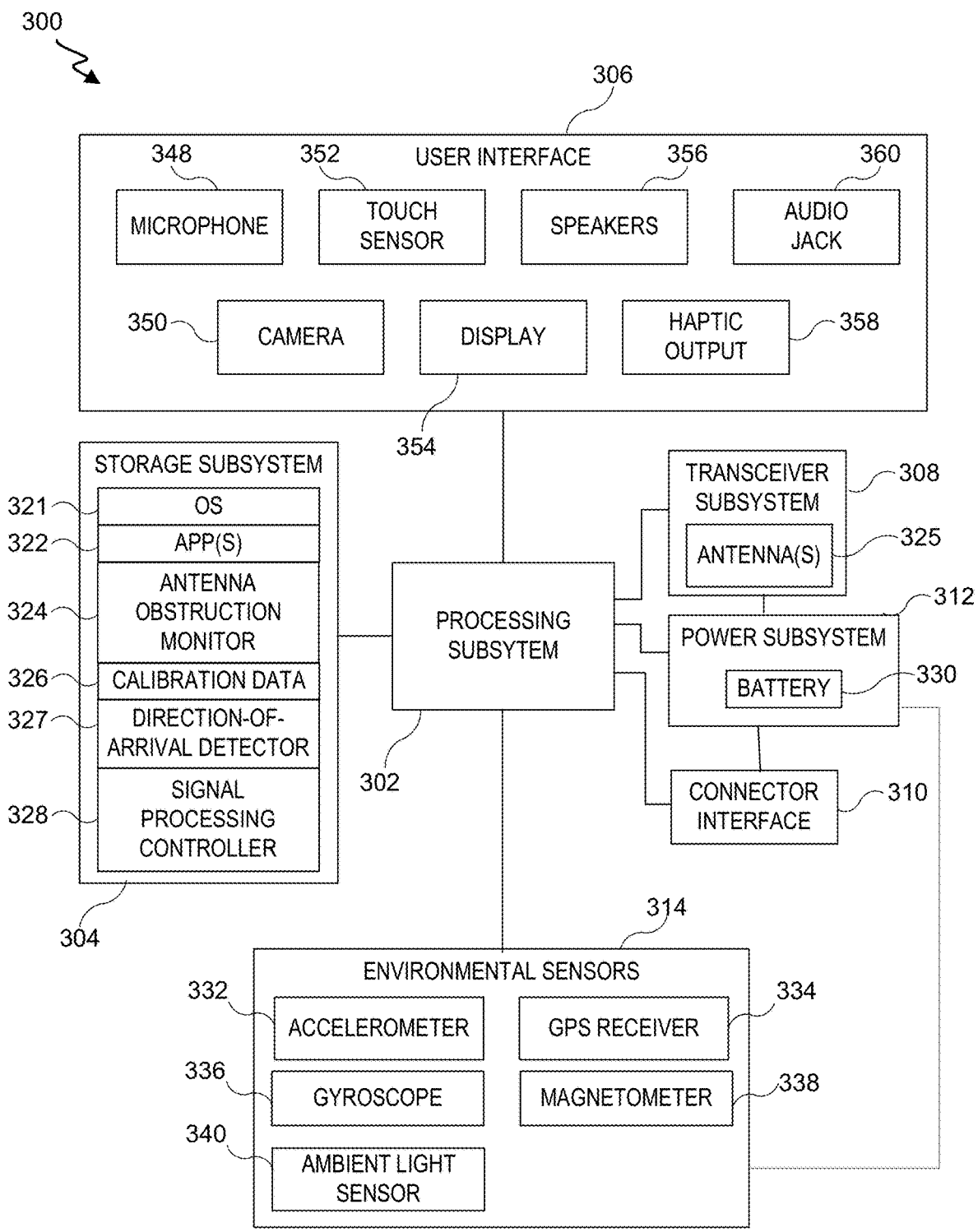
FIG. 3 is an example schematic diagram of an electronic device according to some embodiments of the present invention.

FIG. 3 is an example schematic diagram of an electronic device 300 according to some embodiments of the present invention. Electronic device 300 can include a processing subsystem 302, a storage subsystem 304, a user interface 306, a transceiver subsystem 308, a power subsystem 312 and environmental sensors 314.

Processing subsystem 302 can be implemented as one or more integrated circuits, e.g., one or more single-core or multi-core microprocessors or microcontrollers, examples of which are known in the art. In operation, processing subsystem 302 can control the operation of electronic device 300. In various embodiments, processing subsystem 302 can execute a variety of programs in response to program code and can maintain multiple concurrently executing programs or processes. At any given time, some or all of the program code to be executed can be resident in processing subsystem 302 and/or in storage media such as storage subsystem 304.

Through suitable programming, processing subsystem 302 can provide various functionality for electronic device 300. For example, processing subsystem 302 can execute code to facilitate analyzing one or more signals received at the device to infer whether any antenna(s) are obstructed. The code execution can further include, upon inferring an obstruction, identifying which antenna(s) are obstructed and triggering a change (e.g., a temporary change) in an operation of electronic device 300.

Storage subsystem 304 can be implemented, e.g., using magnetic storage media, flash memory, other semiconductor memory (e.g., DRAM, SRAM), or any other non-transitory storage medium, or a combination of media, and can include volatile and/or non-volatile media.

In some embodiments, storage subsystem 304 can store code or instructions for an operating system 321 and/or one or more application programs (or apps) 322 to be executed by processing subsystem 302. Storage subsystem 304 can store antenna obstruction monitor code 323, calibration data 326, direction-of-arrival detection code 327 and signal-processing controller code 328.

Antenna obstruction monitor code 324 can infer whether any of one or more antennas 325 of transceiver subsystem 308 are obstructed. The inference may be made by processing one or more signals received by one or more receivers of transceiver subsystem 308. Each of the one or more signals can be a response signal and/or impulse response signal that corresponds to and/or is detected within a predetermined time period following a time at which an initial signal (e.g., an impulse signal) is transmitted by a transmitter of transceiver subsystem 308.

The inference can be made by comparing each the one or more signals to a corresponding baseline signal. The comparison can include comparing a characteristic of a signal to a characteristic of a baseline signal. The characteristic can include, for example, a magnitude at a particular point (e.g., x-value or delta t), a maximum magnitude, an integral over part or all of the signal, a statistic (e.g., mean, median, mode, maximum or minimum) calculated across part or all of the signal, a statistic (e.g., mean, median, mode, maximum or minimum) of a first or second directive of part or all of the signal, etc.

The baseline signal(s) can be retrieved from stored calibration data 326. Each baseline signal stored in calibration data 326 may be defined based on (e.g., to be equal to) a single signal detected during a calibration process and/or based on multiple signals detected during a calibration process. For example, three signals may be detected during a calibration signal while a device is in an unobstructed state, and a baseline signal can then be defined as the average or median across the three signals.

Calibration data 326 may be collected while electronic device 300 is in a factory or controlled environment or while electronic device 300 is in a user's possession. For example, a notification may be presented on electronic device 300 that prompts a user to position electronic device 300 is a particular position (e.g., on a flat surface with a screen-side down, on a flat surface in an orientation such that each antenna 325 is not on the surface, etc.). As another example, one or more environmental sensors (e.g., a camera and/or microphone) may be used to infer whether one or more antennas are blocked (e.g., inferring that the antennas are not obstructed when a photo is being taken). A calibration process may be initiated (for example) at set up, at predefined times, at predefined time intervals (e.g., each month from a set up time), upon detecting a predefined type of sub-optimal communication via antenna(s) 325, etc. For example, when a user is setting up a face-identification feature on a phone, a notification may be presented to collect images of the user using the device's camera while holding the device in a manner that does not obstruct antennas of the device. As yet another example, during a set-up of the device or at another time, a notification can be presented for the user to hold a device in a manner that prevents hand occlusion of the antenna, an impulse signal can then be transmitted and one or more impulse response signals can be collected. In some instances, calibration data 326 is read-only data (e.g., if each baseline signal is defined only during manufacture and/or at a factory). In some instances, calibration data 326 can be overwritten upon subsequent calibrations.

When electronic device 300 includes multiple antennas 325, calibration data 326 can include multiple baseline signals. Each baseline signal may be associated with a given type of transceiver-receiver pair. For example, one baseline signal may correspond to an instance where a signal is transmitted by a same antenna that receives a corresponding response signal; another may correspond to an instance where a signal is transmitted by an antenna that is in-line with another antenna that is receiving the response signal. And another may correspond to an instance where a signal is transmitted by an antenna that is catty-corner from another antenna that receives the response signal. In some instances, a baseline signal is individually defined for each specific transmitter-receiver combination. For example, a first baseline signal may be defined for an instance where a first antenna both transmits a signal and receives a response signal, and a second different baseline signal may be defined for an instance where a second antenna both transmits a signal and receives a response signal. Baseline signals may, but need not, be defined to assume that a response signal received at a first antenna based on a particular signal transmitted by a first antenna will, in an unobstructed state, be the same as a response signal received at the second antenna based on the particular signal transmitted by the second antenna.

When electronic device 300 includes multiple antennas 325, antenna-obstruction monitor code 324 can further identify which antenna(s) is/are obstructed. This determination can be made by determining which of the response signals differ from a corresponding baseline signal. For example, if a signal is transmitted by a first antenna, and response signals detected at the first antenna and a second antenna correspond to a baseline signal while a response signal detected at a third antenna does not, it can be inferred that only the third antenna is obstructed. If response signals at all antennas differ from corresponding baseline signals, it may inferred that the first antenna is obstructed. A subsequent assessment may then be performed during which the second antenna or third antenna transmits a signal to further determine whether the second antenna and/or third antenna are also obstructed.

In some instances, when an obstruction is detected, antenna-obstruction monitor code 324 causes a notification to be presented that prompts a user to remove the obstruction. The notification may, but need not, identify which antenna(s) are obstructed (e.g., by presenting a visual representation indicating positions of the antennas on electronic device 300 and indicating which is/are obstructed).

In some instances, when an obstruction is detected, obstruction data is availed to direction-of-arrival detector code 327. Direction-of-arrival detector code 327 can be configured to analyze signal data received at antenna(s) 325 to identify a direction of a source. The signal data analyzed by direction-of-arrival detector code 327 can differ from signal/signal response data analyzed by antenna-obstruction monitor code 324, in that the signal data analyzed by direction-of-arrival detector code 327 can be received from another device. Direction-of-arrival detector code 327 may use any technique for identifying a direction of a source. A technique may include (for example) analyzing relative timings at which a signal was received at each of multiple antennas and/or analyzing differences between phases or amplitudes of signals received at each of multiple antennas.

Direction-of-arrival detector code 327 may change the type of direction-of arrival analysis performed upon receiving an indication that one or more antennas are obstructed. For example, a signal from each of one, more or all obstructed antennas may be omitted from an analysis and/or a less precise and/or reduced-dimension direction can be calculated. In some instances, a signal from an obstructed antenna is scaled, shifted and/or otherwise processed to attempt to generate what would have been an unobstructed version of the signal. This scaling, shifting and/or processing may be determined based on how a magnitude, spread, temporal delay or other characteristic of an impulse response signal assessed by antenna-obstruction monitor code 324 differed from a baseline signal. In some instances, direction-of-arrival detector code 327 may determine to forego calculating a direction of arrival based on antenna-obstruction data. For example, a predefined rule may indicate that a direction of arrival is not to be calculated when (for example) one or more particular antennas are obstructed, at least a predefined threshold number of antennas are obstructed and/or a degree of obstruction at each of one or more antennas exceeds a predefined magnitude.

Signal-processing controller code 328 can be configured to receive direction-of-arrival data and adjust a signal-processing technique to promote directional signal transmission and/or directional signal reception. For example, a signal-processing technique can include performing beamforming or spatial filtering to generate signals to be transmitted via multiple antennas and/or to process signals received at multiple antennas based on information that identifies a direction of a source or target device to achieve spatial selectivity. For example, signals that are to be transmitted can be generated to have particular phases and relative amplitudes that are predicted to cause constructive and destructive interference that will result in a target signal being received at an estimated source location. As another example, signals that are received at multiple antennas may be differentially weighted to generate a desired sensitivity pattern.

In some instances, signal-processing controller code 328 refrains from performing a particular type of signal-processing technique upon receiving an indication that one or more antennas (e.g., a particular antenna or at least a threshold number of antennas) are obstructed. In some instances, obstruction data is used to reconfigure signal processing. For example, weights applied to received signals and/or target characteristics of transmitted signals may be adjusted based on how an impulse response signal at an obstructed antenna differs from a baseline signal. In some instances, a different type of signal processing is performed upon detecting a given type of obstruction. For example, beamforming may be selectively applied only along one axis and/or to a subset of antennas upon detecting an antenna obstruction.

Transceiver subsystem 308 can allow electronic device 300 to transmit signals, receive signals and/or communicate wirelessly with various electronic devices. Transceiver subsystem 308 can include a component, such as an antenna 325 and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 308 can implement a proximity sensor that supports proximity detection (e.g., via NFC or Bluetooth Low Energy) through a detection of a signal, estimation of signal strength and/or other protocols for determining proximity to another electronic apparatus. As noted above, transceiver subsystem 308 and antenna(s) 325 can be used to collect data to determine whether any antenna is obstructed, which may be the same antenna(s) or different antenna(s) than one or more antennas that are used for inter-device communications.

Transceiver subsystem 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into transceiver subsystem 308. In some instances, a same component of transceiver subsystem 308 can serve to receive incoming signals and transmit outgoing signals. In some instances, different components handle incoming and outgoing signals.

In some embodiments, electronic device 300 includes a power subsystem 312 that can provide power management capabilities and power for electronic device 300. Power subsystem 312 can include circuitry to distribute received, converted and/or stored power to other components of electronic device 300 that require electrical power.

In some (but not other instances), power subsystem 312 can include a battery 330 (e.g., a rechargeable battery) and can also include circuitry operable to charge battery 330. Thus, in some embodiments, power subsystem 312 can include a "wireless" charger, such as an inductive charger, to charge battery 330. This capability can be used to extend a time during which electronic device 300 can transmit data (e.g., such that data can be transmitted even when it is not sufficiently close to be powered by a nearby electronic device) and/or can allow electronic device 300 to communicate using a different communication protocol and/or over a larger range.

In some embodiments, power subsystem 312 can control power distribution to components within electronic device 300 to manage power consumption efficiently. For example, power subsystem 312 can automatically place electronic device 300 into a "hibernation" or "sleep" state when it is determined or inferred that no electronic device is nearby (e.g., due to a lack of incoming signals). The hibernation or sleep state can serve to inhibit or pause outgoing transmissions of data. In some instances, a device is also in a "locked" state while it is in a hibernation or sleep state and a normal-operation state, in that biometric data or character passcode that matches a stored unlocking data is required to unlock the device and avail basic device features (e.g., use of primary functions of multiple apps, email apps, ability to place a non-emergency call, etc.).

Power subsystem 312 can also provide other power management capabilities, such as regulating power consumption of other components of electronic device 300 based on the source and amount of available power, monitoring stored power in battery 330, and so on.

In some embodiments, control functions of power subsystem 312 can be implemented using programmable or controllable circuits operating in response to control signals generated by processing subsystem 302 in response to program code executing thereon, or as a separate microprocessor or microcontroller. Power subsystem 312 can be configured to detect whether a power source is a battery or another source (e.g., an AC source). Power subsystem 312 can be configured to detect whether (or when) electronic device 300 is charging and/or connecting to a physical charging element (e.g., a charging cord).

In some instances, electronic device 300 includes one or more environmental sensors 314, such as one or more electronic, mechanical, electromechanical, optical, or other devices that provide information related to internal external conditions around electronic device 300. Environmental sensors 314 in some embodiments can provide digital signals to processing subsystem 302, e.g., on a push (e.g., streaming or regular-communication) basis or in response to polling by processing subsystem 302 as desired. Any type and combination of sensors can be used; shown by way of example are an accelerometer 332, a GPS receiver 334, a gyroscope 336, a magnetometer 338 and an ambient light sensor 340. One or more of environmental sensors 314 (e.g., accelerometer 332, GPS receiver 334, gyroscope 336 and magnetometer 338) can be configured to detect information about a motion and/or location of electronic device 300.

Accelerometer 332 can detect an acceleration of electronic device 300 (e.g., generally or in each of one or more directions). For example, accelerometer 332 can include a three-axis or six-axis accelerometer. Accelerometer data can identify (for example) an acceleration experienced along each of one or more (e.g., three or six) axes and can further identify an orientation of electronic device 300. GPS receiver 334 can receive communications from multiple GPS satellites and estimate a location of electronic device 300. It will be appreciated that other sensors can also be included in addition to or instead of these examples.

Gyroscope 336 can include, for example, a MEMS gyroscope that detects an orientation of electronic device 300. For example, gyroscope 336 can identify an angular position of electronic device 300 along one or more (e.g., three) axes.

Magnetometer 338 can be configured to measure characteristics of a magnetic field. Such characteristics can be used to identify geospatial directions (e.g., identifying which direction, relative to electronic device 300) is north.

Ambient light sensor 340 can include one or more photosensors to identify a light intensity of an ambient environment. The intensity, some instances, is mapped to one or more bands of light intensity, which range from dark-to-light categories. It will be appreciated that electronic device 300 can alternatively or additionally include one or more additional types of sensors, such as a barometer that can be used to detect altitude data.

In some instances, data from one or more environmental sensors 314 may be used to determine whether antenna-obstruction monitor code 324 is to perform a new analysis to determine whether any antenna is obstructed. For example, antenna-obstruction monitor code 324 may assess data from ambient light sensor 340 using a predefined rule to determine whether to initiate an antenna-obstruction assessment. For example, if a light intensity falls below a predefined lower threshold or crosses a predefined upper threshold and/or if a change in light intensity falls below a predefined lower change threshold or crosses a predefined upper change threshold, then antenna-obstruction monitor code 324 may initiate a new antenna-obstruction analysis. Similarly, a predefined rule may indicate that an antenna-obstruction analysis is to be initiated upon detecting acceleration data that exceeds a predefined acceleration threshold, a change in orientation data that exceeds a predefined orientation threshold, a change in location that exceeds a predefined location threshold and/or a change in magnetic field that exceeds a predefined magnetic-field threshold.

In some instances, data from one or more environmental sensors 314 is used in conjunction with signals received at one or more antennas 325 (e.g., impulse response signals) to determine whether any antenna is obstructed. For example, electronic device 300 may include multiple ambient light sensors 340, at least one of which is positioned near at least one antenna 325 and at least one other of which is positioned on another surface of electronic device 300. Antenna-obstruction mode code 324 may be configured such that an obstruction detection is more likely to occur when ambient light detected by the at least one other antenna is more intense than ambient light detected by the at least one ambient light sensor.

User interface 306 can include any combination of input and output devices. In some instances, a user can operate input devices of user interface 306 to invoke the functionality of electronic device 300 and can view, hear, and/or otherwise experience output from electronic device 300 via output devices of user interface 306. Examples of input devices include microphone 348, touch sensor 352, and camera 350. Examples of output devices include display 354, speakers 356, and haptic output generator 358.

Microphone 348 can include any device that converts sound waves into electronic signals. In some embodiments, microphone 348 can be sufficiently sensitive to provide a representation of specific words spoken by a user; in other embodiments, microphone 348 can be usable to provide indications of general ambient sound levels without necessarily providing a high-quality electronic representation of specific sounds.

Camera 350 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 304 and/or transmitted by electronic device 300 to other devices for storage. Depending on implementation, the optical components can provide fixed focal distance or variable focal distance; in the latter case, autofocus can be provided. In some embodiments, camera 350 can be disposed along an edge of a face member of a device, e.g., the top edge, and oriented to allow a user to capture images of nearby objects in the environment such as a bar code or QR code. In other embodiments, camera 350 can be disposed on the front surface of a device face member, e.g., to capture images of the user. Zero, one, or more cameras can be provided, depending on implementation.

Touch sensor 352 can include, e.g., a capacitive sensor array with the ability to localize contacts to a particular point or region on the surface of the sensor and in some instances, the ability to distinguish multiple simultaneous contacts. In some embodiments, touch sensor 352 can be overlaid over display 354 to provide a touchscreen interface, and processing subsystem 302 can translate touch events (including taps and/or other gestures made with one or more contacts) into specific user inputs depending on what is currently displayed on display 354.

Display 354 can be implemented using compact display technologies, e.g., LCD (liquid crystal display), LED (light-emitting diode), OLED (organic light-emitting diode), or the like. In some embodiments, display 354 can incorporate a flexible display element or curved-glass display element, allowing electronic device 300 to conform to a desired shape. One or more speakers 356 can be provided using small-form-factor speaker technologies, including any technology capable of converting electronic signals into audible sound waves. In some embodiments, speakers 356 can be used to produce tones (e.g., beeping or ringing) and can but need not be capable of reproducing sounds such as speech or music with any particular degree of fidelity. Haptic output generator 358 can be, e.g., a device that converts electronic signals into vibrations; in some embodiments, the vibrations can be strong enough to be felt by a user wearing electronic device 300 but not so strong as to produce distinct sounds.

In some embodiments, user interface 306 can provide output to and/or receive input from an auxiliary device such as a headset. For example, audio jack 360 can connect via an audio cable (e.g., a standard 3.5-mm or 3.5-mm audio cable) to an auxiliary device. Audio jack 360 can include input and/or output paths. Accordingly, audio jack 360 can provide audio to the auxiliary device and/or receive audio from the auxiliary device. In some embodiments, a wireless connection interface can be used to communicate with an auxiliary device.

One or more output devices can be used to present a notification that an antenna is obstructed. For example, a visual notification can be presented on display 354, a vibration can be presented via haptic output 358 and/or an audio stimulus can be presented via speakers 356.

Further, while the electronic device 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including devices implemented using any combination of circuitry and software. It is also not required that every block in FIG. 3 be implemented in a given embodiment of an electronic device.

Figure 4:
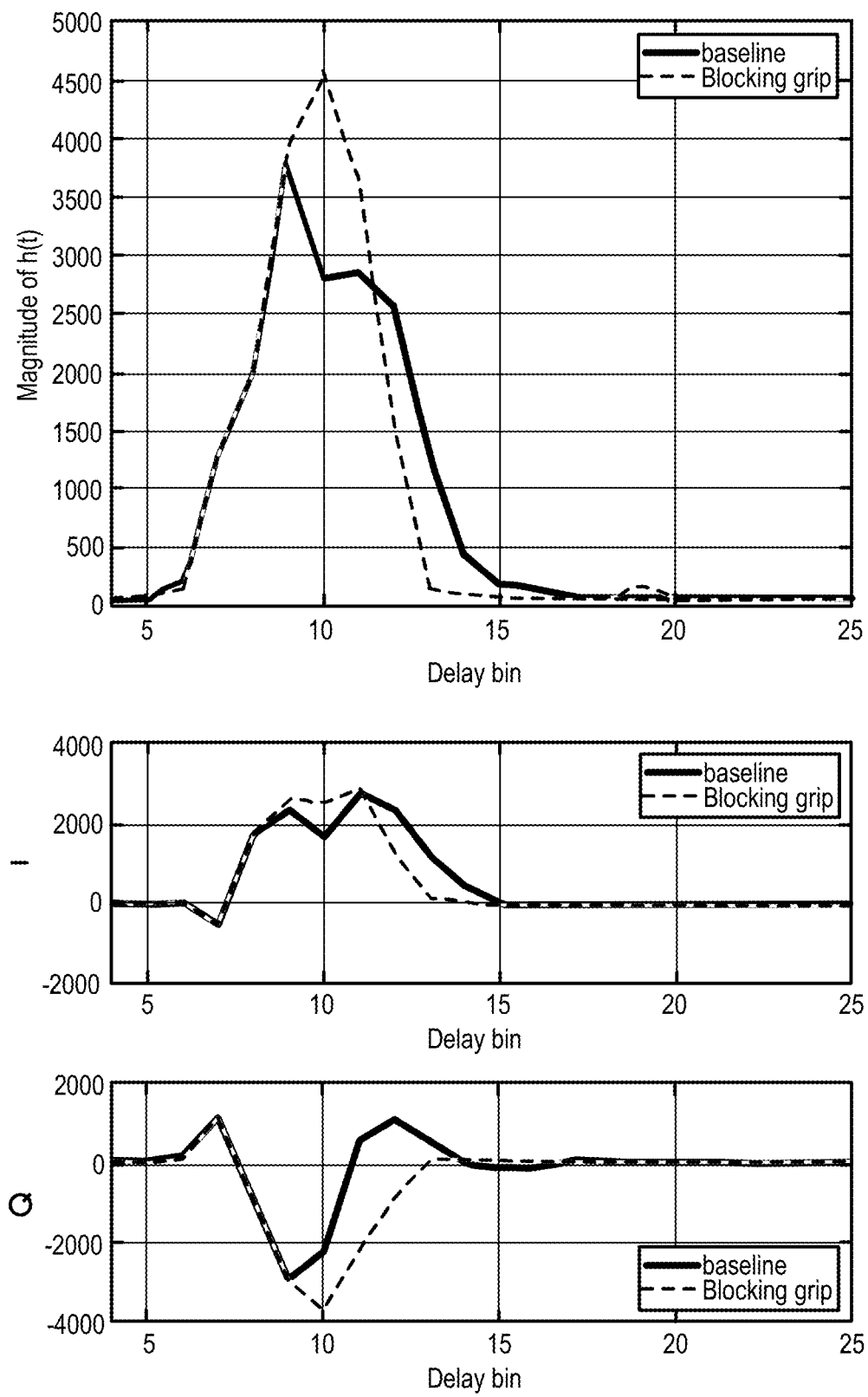
FIG. 4 illustrates exemplary response signals and components thereof in each of a normal state and an antenna-blocked state.

FIG. 4 illustrates exemplary response signals and components thereof in each of a normal state and an antenna-blocked state. More specifically, the top plot shows a full impulse response signal received at an antenna, the middle plot shows the in-phase component of the impulse response signal, and the bottom plot shows the quadrature component of the impulse response signal. The solid line corresponds to the baseline signal, and the dashed line corresponds to an instance in which both the antenna having transmitting the impulse signal and the antenna receiving the impulse response signal are both obstructed.

The obstructed-antenna signal differs from the baseline signal in multiple respect. For example, the magnitudes of the full impulse response signal differs from the magnitude of the full obstructed-antenna signal at bins 9-14. In this instance, each time bin corresponds to a nanosecond. Similarly, for each of these bins, the magnitude of the in-phase component of the obstructed-antenna signal differs from the in-phase component of magnitude of the baseline signal, and the magnitude of the quadrature component of the obstructed-antenna signal differs from the quadrature component of the baseline signal. As another example, a maximum value of the full obstructed-antenna signal differs from a maximum value of the full baseline signal, and a minimum value of the quadrature component of the obstructed-antenna signal differs from a minimum value of the in-phase component of the baseline signal. The difference may be due to reflections of an impulse signal from an object that is occluding one or more antennas.

In some instances, with respect to a full signal or signal component, a different of the obstructed-antenna signal/component and the baseline signal component can be calculated. A statistic may be defined as (for example) a sum of the difference over a set of time bins (e.g., all time bins or a subset thereof), a sum of an absolute value of the difference over a set of time bins, or a sum of a square of the difference over a set of time bins. Non-zero values for such statistics may indicate that a full signal differs from a baseline signal.

Figure 5A:
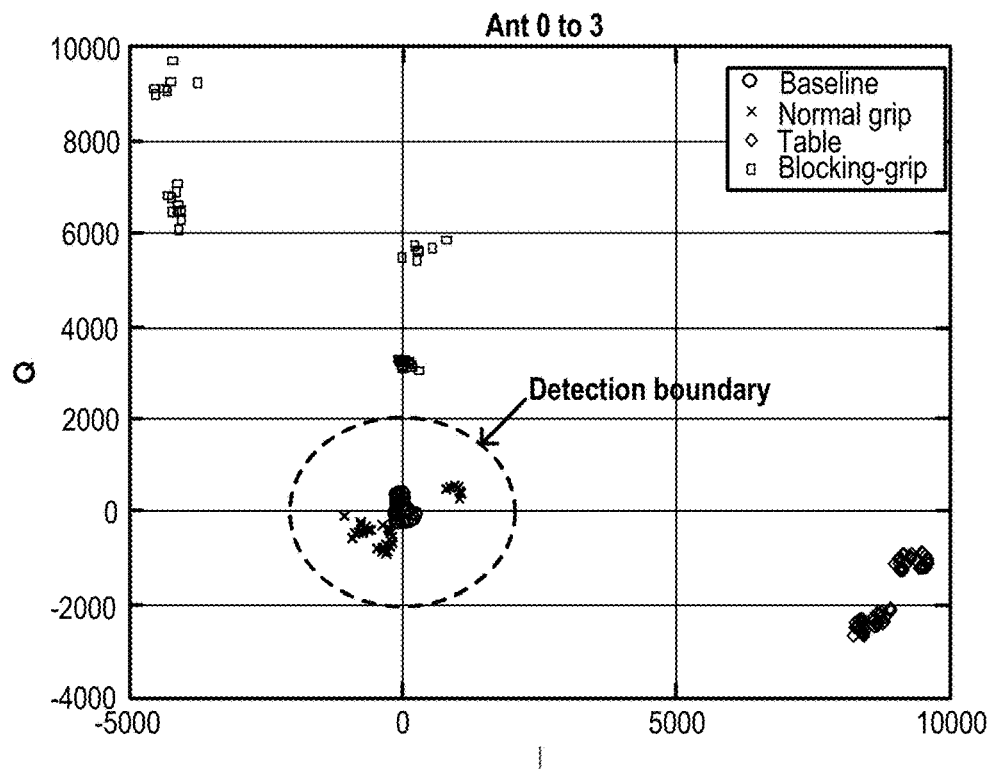
FIGS. 5A-5B illustrate response-signal metrics for each of multiple samples collected during different positions and/or uses of a device.
Figure 5B:
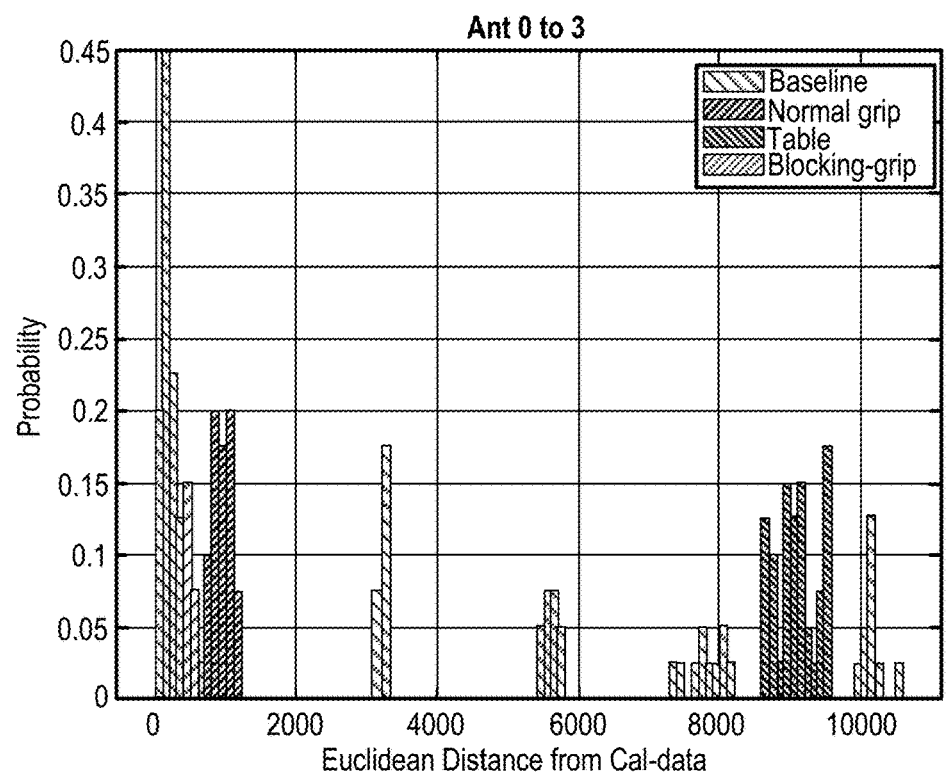

FIGS. 5A-5B illustrate response-signal metrics for each of multiple samples collected during different positions and/or uses of a device. Specifically, a set of impulse response signals was collected. The set of impulse response signals correspond ones received at a bottom antenna (e.g., at a position similar to that of second antenna 210b in FIG. 2A) subsequent to transmission of impulse signals transmitted by a top antenna (e.g., at a position similar to that of top antenna 210a in FIG. 2A). The set included four subsets, each of which corresponded to a different device environments. For a first "idle" subset, all antennas are unobstructed, no obstacles are nearby, and a user is not holding the device. For a second subset, a user is holding the device but not obstructing any antenna. For a third subset, the device is positioned on a table, with the antennas facing the table. For a fourth subset, a user is holding the device and blocking all a transmitting antenna and receiving antenna.

For each sample, a quadrature component of a baseline signal is subtracted from a quadrature component of the full impulse response signal, and an in-phase component of the baseline signal is subtracted from an in-phase component of the full impulse response signal. FIG. 5A shows, for each of the set of impulse response signals, a magnitude of the quadrature-component difference at a $10^{th}$ time bin plotted against a magnitude of the in-phase-component difference at the $10^{th}$ time bin. Data symbols indicate to which subset the data point corresponds. Several clusters emerge. All baseline data points and normal-grip data points are near the origin and within a region denoted by the dashed oval (where both the in-phase and quadrature values are greater than −2000 and less than 2000). All table data points are associated with high in-phase values (over 7000) and low quadrature values (less than 0). All blocking-grip data points are associated with high quadrature values (greater than 2000), and some block-grip data points are associated with low in-phase values (less than −3000).

Notably, both the third and fourth subsets can correspond to antenna-blocked instances, for which is may be desirable to change a default device operation (e.g., to present a notification of antenna obstruction, change or forego identifying a direction of arrival and/or adjust or forego a given type of signal processing). Thus, for each of the data points shown in FIG. 5A, a Euclidean distance is calculated between the data point and the origin. FIG. 5B shows a histogram of the distances. All distances from the first and second subsets (during which antennas are not obstructed) have distances less than 1500. All distances from the third and fourth subsets have distances that exceed 2000, with the vast majority exceeding 5000.

Thus, the data from FIGS. 5A and 5B illustrate that thresholding and/or clustering even individual data points from time-series data may be sufficient to detect when an antenna is obstructed. It will be appreciated that this analysis or another analysis may be extended to increase in its dimensionality and/or concurrently or iteratively process data from multiple time steps.

In some instances, in order to estimate which antenna is obstructed, a loop-back channel matrix $H(\tau)$ is populated as follows:

$$H(\tau) = \begin{bmatrix} h(1, 1, \tau) & h(1, 2, \tau) & \ldots & h(1, N_{Rx}, \tau) \\ h(2, 1, \tau) & \ddots & \ddots & \vdots \\ \vdots & \ddots & \ddots & \vdots \\ h(N_T, 1, \tau) & h(N_{Tx}, 2, \tau) & \ldots & h(N_{Tx}, N_{Rx}, \tau) \end{bmatrix}$$

where $h(k, l, \tau)$ is the complex impulse response signal measurement for the k'th transmission antenna, l'th receiving antenna at the delay $\tau$. Then H can be compared with $H_{cal}$, which is a channel matrix measured during calibration. The occlusion decision can be made based on a norm (e.g., Euclidean, Frobenius, Max, etc.) of the difference matrix $\|H - H_{cal}\|$. By investigating rows and columns of the $H(\tau)$ matrix, it can be estimated which antenna is likely blocked. For example, if k'th antenna is blocked, a larger difference between $H(\tau)$ and $H_{cal}$ at k'th row and/or k'th column may be observed.

One metric that can be used to determine whether antenna occlusion was present can include:

$M(k,l,\tau) = I(|h(k,l,\tau) - h_{cal}(k,l,\tau)| - \delta(k,l,\tau)), \forall k \in [1, N_{Rx}],$
$\forall l \in [1, N_{Rx}], \forall \tau \in [1, N_T]$ where:
- $h(k,l,\tau)$ is the complex impulse response signal measurement for the k'th transmission antenna, l'th receiving antenna at the delay $\tau$;
- $h_{cal}(k,l,\tau)$ is the complex calibration impulse response signal measurement for the k'th transmission antenna, l'th receiving antenna at the delay $\tau$,
- $\delta(k,l,\tau)$ is the threshold set for the k'th transmission antenna, l'th receiver antenna at the delay $\tau$, and
- $I(\bullet)$ is the indicator function defined as $I(x)=1$ when $x \geq 0$ and $I(x)=0$ when $x<0$.

It can be estimated that an occlusion occurred at time t when a total number of affected entries $\sum_{\tau=1}^{N_T} \sum_{k=1}^{N_{Tx}} \sum_{l=1}^{N_{Rx}} M(k, l, \tau)$ is larger than a set threshold. Further, it can be estimated that an antenna that is most likely to have been blocked as follows:

$$\operatorname*{argmax}_{n} D(n, t)$$

where $$D(n) = \begin{cases} \frac{1}{N_{Rx} + N_{Tx} - 1} \sum_{\tau=1}^{N_T} \left( \sum_{l=1}^{N_{Rx}} M(n, l, \tau) + \sum_{k=1}^{N_{Tx}} M(k, n, \tau) \right), & \text{if antenna } n \text{ is both measured as } Tx \text{ and } Rx \\ \frac{1}{N_{Rx}} \sum_{\tau=1}^{N_T} \sum_{l=1}^{N_{Rx}} M(n, l, \tau), & \text{if antenna } n \text{ is only measured as } Tx \\ \frac{1}{N_{Tx}} \sum_{\tau=1}^{N_T} \sum_{k=1}^{N_{Tx}} M(k, n, \tau), & \text{if antenna } n \text{ is only measured as } Rx \end{cases}$$

Figure 6:
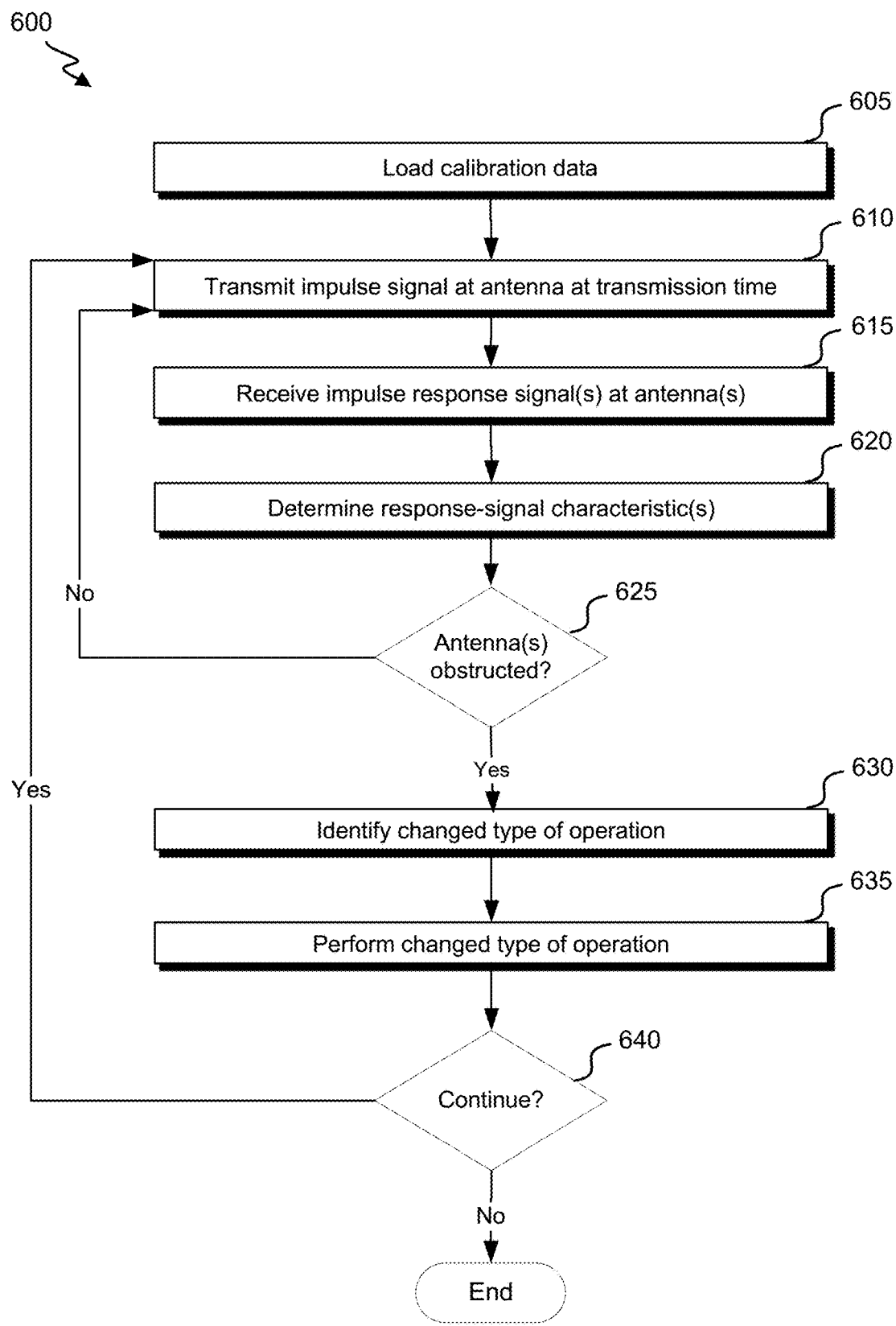
FIG. 6 illustrates a process for determining device operations based on determinations as to whether device antennas are partly/fully blocked.

FIG. 6 illustrates a process 600 for determining device operations based on determinations as to whether device antennas are partly/fully blocked. Process 600 begins at block 605, at which an electronic device loads calibration data. The calibration data can include one or more baseline signals (e.g., one or more baseline impulse response signals). In some instances, each of the one or more baseline signals is associated with a particular antenna pair and/or type of antenna pair (e.g., indicating a spatial relationship between antennas of the pair). A baseline signal may, but need not, indicate which of an antenna pair is associated with a signal transmission and/or which of the antenna pair is associated with receiving a response signal. In some instances, in addition to or instead of including one or more baseline signals, the calibration data includes one or more statistics of each of one or more baseline signals. For example, the one or more statistics may include an intensity at a particular time point within the signal, an integral of a part of the signal, etc.

At block 610, an antenna of the electronic device transmits an impulse signal transmission time. The transmission may be a result of a transmitter connected to the antenna having supplied electric current to terminals of the antenna, such that the antenna radiates energy from the current.

At block 615, with respect to each of the one or more antennas, an impulse response signal is received. Block 615 can include an antenna converting a wave to electric current at its terminal and a receiver amplifying the current, such that it can be then represented digitally. An impulse response signal may be received at a same antenna that transmitted an impulse signal, and potentially, another impulse response signal may be received at another antenna. The impulse response signal can be defined such that (for example) t=0 is defined to correspond to the transmission time. Each of the one or more antennas may be (for example) a planar antenna on a surface of the electronic device.

At block 620, for each of the received impulse response signals, one or more response-signal characteristics are determined. A response-signal characteristic can include (for example) a one or more magnitudes or intensities of the signal (or component thereof), which may include a magnitude or intensity at a particular time point (relative to the transmission time) or a maximum, minimum or maximum absolute value of the impulse response signal.

In some instances, the response-signal characteristic(s) can be based on a baseline signal or characteristic thereof from the calibration data. For example, a response-signal characteristic can include a difference between a magnitude of the impulse response signal and a baseline signal at a given time point, a difference between a maximum or minimum of the impulse response signal and a maximum or minimum of a baseline signal, etc. It will be appreciated that a response-signal characteristic may be determined based on an assessment of one or more components (e.g., an in-phase and/or quadrature component) of the impulse response signal and potentially of one or more components of the baseline signal.

In some instances, blocks 615-620 are performed for each of multiple antennas. For example, each of multiple antennas may receive an impulse response signal corresponding to a single impulse transmission. The impulse response signals can then be processed and/or assessed in parallel, serially, individually and/or in combination.

At block 625, it is determined whether any antenna of the one or more antennas are obstructed. The determination can be made based on the response signal characteristic(s) determined at block 620. In some instances, block 625 includes determining whether a characteristic (e.g., that includes a value or statistic) is above an upper threshold and/or below a lower threshold. In some instances, block 625 includes determining whether the characteristic(s) is/are assigned (e.g., as a result of a clustering analysis and/or classification analysis) to one or more specific clusters or classes. In some instances, block 625 includes determining whether a particular predefined condition is satisfied based on the characteristic(s).

When it is determined that there is no antenna obstruction, process 600 can return to block 610, and monitoring for potential antenna obstruction can continue to occur (e.g., at predefined intervals, at predefined times, in response to detecting particular types of events, etc.). While no obstruction has been detected, the electronic device may proceed to continue to perform a given type of operation (e.g., interdevice-communication signal processing, beamforming, etc.) in accordance with a default operation technique.

When it is determined that there is an antenna obstruction, process 600 can continue to block 630 at which a changed type of operation can be identified. At block 635, the changed type of operation is performed. At block 640, it is determined whether to continue to monitor for antenna obstruction. For example, a rule may indicating that such monitoring is to be performed during particular hours of the day, while a particular application is in use, while a device is transmitting communications to another device, so long as the electronic device has sent or received a communication to a device (e.g., a particular type of device and/or using a particular type of network) within a predefined period of time, etc. If it is determined that such monitoring is to continue, process 600 can return to block 610. Otherwise, process 600 can end (e.g., for at least a predefined period of time or until an event occurs indicating that antenna-obstruction monitoring is to continue.

In some devices, the temperature change may affect the measured impulse responses due to temperature dependent performance of radio frequency elements. If temperature drift is not properly compensated, the occlusion detection may suffer from false alarms. In some embodiments, techniques can be implemented to detect and/or compensate for temperature drive. For example, parallel to the blocks 610 and 615, the device can also perform impulse response measurements excluding the effects of the antennas. The impulse response measurements with and without the antennas that can be referred to as external and internal measurements, respectively. The external measurement (block 610 & 615) contains the response of transmitter IC, transmitter antenna, over the air channel (which includes the effect any occlusion), receive antenna and receiver IC. However, the internal measurement only contains the response from transmitter IC and receiver IC. The temperature drift can primarily affect the active elements in transmitter and receiver ICs. Hence by equalizing the external measurements with the internal measurements, the process can remove the effects of temperature drift. Consequently, equalized impulse responses can be used to make the occlusion decision in the same manner already described in the patent.

Figure 7:
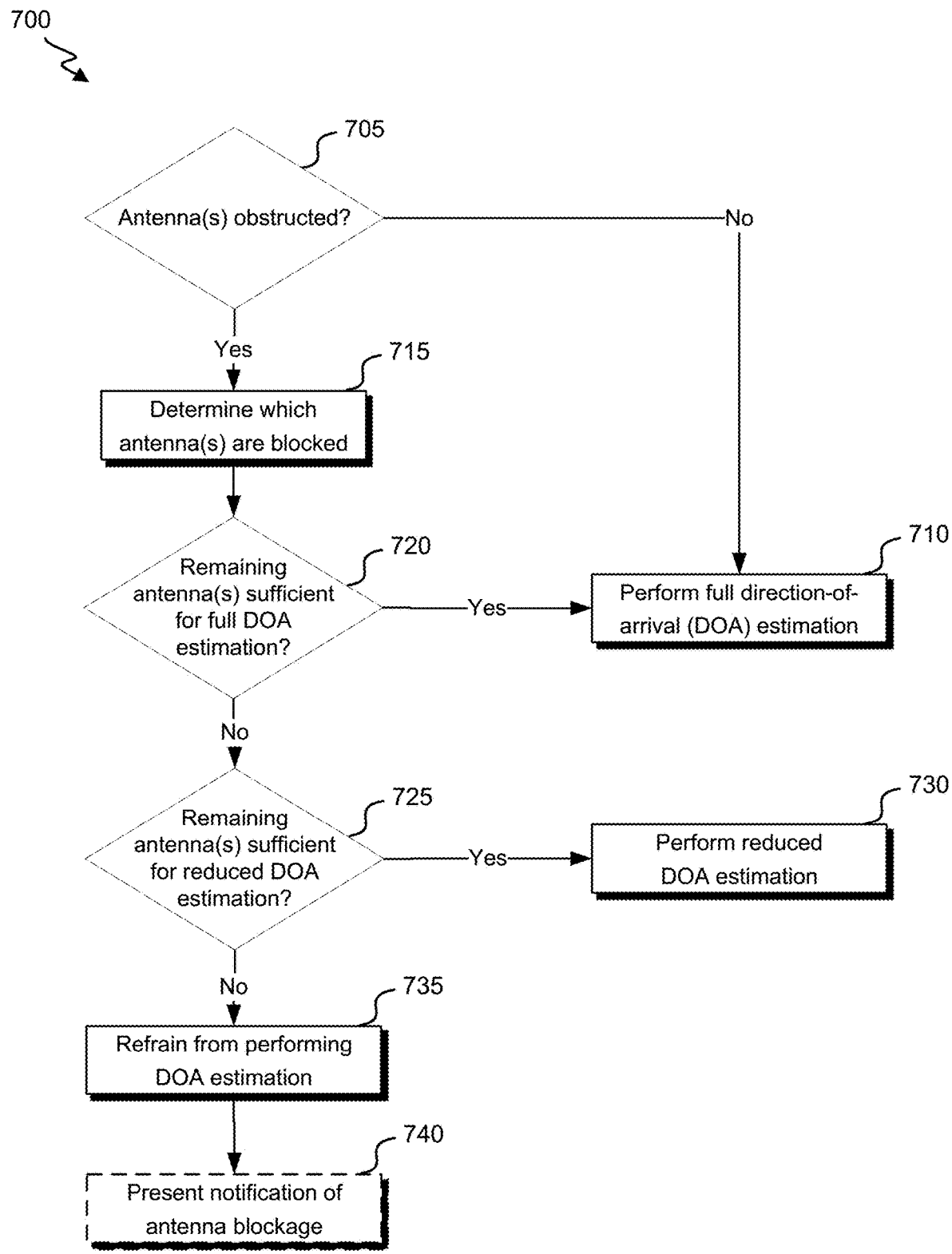
FIG. 7 illustrates a process for determining device operations based on determinations as to whether device antennas are partly/fully blocked.

FIG. 7 illustrates a process 700 for determining device operations based on determinations as to whether device antennas are partly/fully blocked. In some instances, the identification of a changed type of operation performed at block 630 of process 600 includes part of process 700 (e.g., blocks 715, 720 and/or 725) and/or performing the changed type of operation performed at block 635 of process includes part of process 700 (e.g., block 710, 730, 735 and/or 740).

Process 700 begins at block 705 where an electronic device determines whether any antenna of one or more antennas (e.g., one or more planar antennas on the electronic device and/or one or more antennas used for a direction-of-arrival estimation by the electronic device) are obstructed. Block 705 can correspond to block 625 from process 600 and may use data (e.g., including one or more signals and/or characteristics) and/or assessments as indicated in association with process 600 and/or otherwise described herein. Determining whether any antenna is obstructed can include determining whether any antenna is obstructed to at least a threshold extent. For example, an extent of obstruction may be inferred by quantifying an extent to which each of one or more impulse response signals associated with an individual antenna differs from a baseline signal (e.g., using one or more characteristics of the signal and/or components thereof).

If it is determined that none of the one or more antennas are obstructed (e.g., by at least the threshold extent), process 700 can continue to block 710, at which a full direction-of-arrival estimation is performed. The direction-of-arrival estimation can be performed using one or more signals received at one or more antennas from another device. The one or more signals may include multiple signals, each of which is received at a different antenna. The multiple signals may correspond to a single transmission from the other device but may (for example) be associated with different detection times, magnitudes, phases and/or component intensities. The direction-of-arrival estimations may be performed by comparing properties of the signals received at different antennas (e.g., comparing intensities corresponding to one or more particular time points, phases, etc.). The direction-of-arrival estimation can be performed to estimate (for example) a three-dimensional direction or a two-directional direction. Signal processing may then be configured based on the estimated direction (e.g., to process incoming signals and/or generate outgoing signals).

If it is determined that at least one antenna is obstructed, process 700 can continue to block 715 at which the electronic device determines which antenna(s) are blocked. This determination may be performed by determining which of the received impulse response signals differ (e.g., by a threshold amount) from a corresponding baseline signal. The determination may alternatively or additionally be based on a comparison of signal characteristics, a comparison of signal components and/or a comparison of characteristics of signal components. In some instances, block 715 includes applying one or more predefined rules, which may evaluate (for example) for which antenna pairs an impulse response signal sufficiently differs from a baseline signal and/or for which individual antenna (serving both as a transmitting and receiving antenna) an impulse response signal sufficiently differs from a baseline signal. In some instances, block 715 includes applying a multi-dimensional analysis, clustering technique, classification technique, neural network (e.g., recurrent neural network), etc. Block 715 may include processing a difference between a detected impulse response signal and a baseline signal or a characteristic of the difference. It will be appreciated that, in some instances, process 700 can omit block 715 (e.g., when the electronic device only includes one antenna that is used for direction-of-arrival assessments).

At block 720, the electronic device determines whether any remaining antenna(s) that is/are not obstructed is/are sufficient to perform a full direction-of-arrival estimation. This assessment may include applying a predefined rule. If it is determined that the remaining antenna(s) is/are sufficient, process 700 can proceed to block 710.

Otherwise, process 700 can proceed to block 725 at which it is determined whether any remaining antenna(s) that is/are not obstructed is/are sufficient to perform a reduced direction-of-arrival estimation. A reduced direction-of-arrival estimation can include generating an estimated direction that has a dimensionality and/or precision that is less than a dimensionality and/or precision of a direction that would be produced by the full direction-of-arrival estimation. A reduced direction-of-arrival estimation may be configured to use fewer impulse response signals and/or data from fewer antennas as compared to those used for the full direction-of-arrival estimation. The determination at block 725 can include determining whether there are at least a predefined number of antennas that are unobstructed or associated with an obstruction magnitude that is below a predefined magnitude threshold.

If it is determined that there is a sufficient number of antennas that are not obstructed (and/or not obstructed beyond a predefined degree), process 700 can proceed to block 730, at which the electronic device performs a reduced direction-of-arrival estimation. Performing the reduced direction-of-arrival estimation can refrain from using signal data from the obstructed antenna(s). The reduced direction-of-arrival estimation may generate a direction along fewer axes and/or with less precision than would be a direction estimated by performing the full direction-of-arrival estimation. Signal processing may then be configured based on the estimated direction (e.g., to process incoming signals and/or generate outgoing signals).

If it is determined that there is a sufficient number of antennas that are not obstructed (and/or not obstructed beyond a predefined degree), process 700 can proceed to block 735, at which the electronic device refrains from performing a direction-of-arrival estimation. Signal processing that is configured to potentially use direction-of-arrival estimates may be set to use a default direction estimate and/or to proceed using a default processing. In some instances, at block 740, electronic presents a notification (e.g., a visual, haptic and/or audio notification) that is indicative of the antenna obstruction.

Techniques disclosed herein thus can use low-energy approaches to repeatedly assess whether any antenna that may be used for direction-of-arrival estimation is obstructed. If such obstruction is detected, operation of the device may be changed to adjust signal processing and/or alert the user. Thus, erroneous direction-of-arrival estimation can be reduced and inter-device communications can be improved. More specifically, signal-processing techniques can still be used when sufficiently accurate data is expected, which can improve communications during this time. However, when processing of impulse response signals indicate that direction-of-arrival estimates may be inaccurate (due to antenna obstruction), the signal-processing techniques can be adjusted or avoided, so as to avoid actively impairing inter-device communications. It will be appreciated that occlusion-detection techniques disclosed herein can be applicable to a variety of wireless systems, including those using Ultra-wideband (UWB), WLAN and Bluetooth.

Further, occlusion-detection measurements and processing can occur while an electronic device is being used for other purposes. For example, while a device is transmitting ranging distance-estimation signals, direction-of-arrival sounding signals or data payload signals to another connected device, it may use a same transmit signal (e.g., rather than an impulse signal) for simultaneous occlusion detection by receiving and processing reflected signals using the device's receiver(s).

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. An electronic device comprising:
    a transmitter;
    a receiver;
    an antenna coupled to the transmitter and to the receiver;
    one or more data processors; and
    a non-transitory computer readable storage medium containing instructions which, when executed on the one or more data processors, cause the one or more data processors to perform actions including:
        identifying a transmission time at which the transmitter transmitted a signal;
        detecting a response signal received at the receiver subsequent to the transmission time;
        determining, based at least in part on the response signal and on the transmission time, one or more response-signal characteristics;
        determining, based at least in part on the one or more response-signal characteristics, that the antenna is at least partly blocked from emitting or receiving signals; and
        in response to determining that the antenna is at least partly blocked:
            identifying a subset of antennas of the electronic device that does not include the antenna; and
            performing a directionality analysis using the subset of antennas to identify a direction of another device relative to the electronic device.

2. The electronic device of claim 1, further comprising:
    an other transmitter;
    an other receiver; and
    an other antenna;
    wherein the actions further include:
        identifying an other transmission time at which the other transmitter transmitted an other signal;

detecting, within a predefined time period from the other transmission time:
a first response signal received at the other receiver; and
a second response signal received at the receiver;
detecting, within a predefined time period from the transmission time, a third response signal received at the other receiver; and
determining, based at least in part on the first response signal, the second response signal and the third response signal, a set of other response-signal characteristics, wherein the determination that the antenna is at least partly blocked is further based at least in part on the set of other response-signal characteristics.

3. The electronic device of claim 1, wherein:
performing the directionality analysis comprises performing a reduced precision directionality analysis to identify the direction of the other device relative to the electronic device, wherein the direction associated with the reduced precision directionality analysis is within a reduced dimensionality space as compared to a default dimensionality space associated with a default precision directionality analysis.

4. The electronic device of claim 1, further comprising, in response to determining that the antenna is at least partly blocked:
presenting, at the electronic device, a notification indicating that the antenna is blocked and/or that an impairment is reducing device performance.

5. The electronic device of claim 1, wherein:
the response signal comprises an impulse-response signal or a component thereof; and
the one or more response-signal characteristics comprise a response signal intensity after a predetermined duration following the transmission time.

6. The electronic device of claim 1, wherein:
the one or more response-signal characteristics comprise a comparison statistic generated using the response signal and a baseline signal.

7. A computer-implemented method comprising:
identifying a transmission time at which an antenna of an electronic device transmitted a signal;
detecting a response signal received at the electronic device subsequent to the transmission time;
determining, based at least in part on the response signal and on the transmission time, one or more response-signal characteristics;
determining, based at least in part on the one or more response-signal characteristics, that the antenna or that an other antenna of the electronic device is at least partly blocked from emitting or receiving signals; and
in response to determining that the antenna or the other antenna is at least partly blocked,
performing a reduced precision directionality analysis to identify a direction of an other device relative to the electronic device, wherein the direction associated with the reduced precision directionality analysis is within a reduced dimensionality space as compared to a default dimensionality space associated with a default precision directionality analysis.

8. The computer-implemented method of claim 7, wherein:
the response signal is received from the antenna of the electronic device;
the method further includes:
detecting an other response signal received at the electronic device, the other response signal being received from the other antenna of the electronic device; and
determining, based at least in part on the other response signal, one or more other response-signal characteristics; and
using the one or more other response-signal characteristics to determine that the other antenna is at least partly blocked.

9. The computer-implemented method of claim 7, further comprising:
detecting a set of response signals, wherein the set of response signals includes the response signal, and wherein the set of response signals corresponds to a set of pair-wise transmissions and receptions between a plurality of antennas of the electronic device, the plurality of antennas including three or more antennas.

10. The computer-implemented method of claim 7, further comprising:
identifying a subset of antennas that does not include the antenna when the antenna is determined to be at least partly blocked or the other antenna when the other antenna is determined to be at least partly blocked;
wherein the reduced precision directionality analysis is performed using the subset of antennas of the electronic device.

11. The computer-implemented method of claim 7, further comprising, in response to determining that the antenna or the other antenna is at least partly blocked:
presenting, at the electronic device, a notification indicating that at least one antenna of the electronic device is blocked and/or that an impairment is reducing device performance.

12. The computer-implemented method of claim 7, wherein:
the response signal comprises an impulse-response signal or a component thereof; and
the one or more response-signal characteristics comprises a response signal intensity after a predetermined duration following the transmission time.

13. A computer-program product tangibly embodied in a non-transitory machine-readable storage medium, including instructions configured to cause one or more data processors to perform actions including:
detecting an impulse-response signal received at a receiver of an electronic device, the impulse-response signal corresponding to an impulse signal transmitted by an antenna of the electronic device;
determining, based at least in part on the impulse-response signal, one or more impulse-response-signal characteristics;
determining, based at least in part on the one or more impulse-response-signal characteristics, that the antenna or that an other antenna of the electronic device is at least partly blocked from emitting or receiving signals; and
in response to determining that the antenna or that the other antenna is at least partly blocked:
identifying a set of antennas of the electronic device, the set excluding at least the antenna when the antenna is determined to be at least partly blocked or excluding at least the other antenna when the other antenna is determined to be at least partly blocked; and
performing a directionality analysis using the set of antennas to identify a direction of another device relative to the electronic device.

14. The computer-program product of claim 13, wherein:
the impulse-response signal is received from the antenna of the electronic device;
the actions further include:
  detecting an other impulse-response signal received at the electronic device, the other impulse-response signal corresponding to another impulse signal transmitted by the other antenna of the electronic device; and
  determining, based at least in part on the other impulse response signal, one or more other impulse-response-signal characteristics; and
the determining that the antenna or that the other antenna is at least partly blocked is further based at least in part on the one or more other impulse-response-signal characteristics.

15. The computer-program product of claim 13, wherein the actions further include:
detecting a set of impulse-response signals, wherein the set of impulse-response signals includes the impulse-response signal, and wherein the set of impulse-response signals corresponds to a set of pair-wise transmissions and receptions between a plurality of antennas of the electronic device, the plurality of antennas including three or more antennas.

16. The computer-program product of claim 13, further comprising, in response to determining that the antenna or the other antenna is at least partly blocked:
performing a reduced precision directionality analysis to identify the direction of another device relative to the electronic device, wherein the direction associated with the reduced precision directionality analysis is within a reduced dimensionality space as compared to a default dimensionality space associated with a default precision directionality analysis.

17. The computer-program product of claim 13, further comprising, in response to determining that the antenna or the other antenna is at least partly blocked:
presenting, at the electronic device, a notification indicating that the antenna is blocked and/or that an impairment is reducing device performance.

18. The computer-program product of claim 13, wherein:
the one or more impulse-response-signal characteristics comprise a response signal intensity after a predetermined duration following a time at which the impulse signal was transmitted.

19. The computer-program product of claim 13, wherein:
the one or more impulse-response-signal characteristics comprise a comparison statistic generated using the impulse-response signal and a baseline signal.

20. The computer-implemented method of claim 7, wherein:
the one or more response-signal characteristics comprise a comparison statistic generated using the response signal and a baseline signal.

* * * * *